Figure 1:
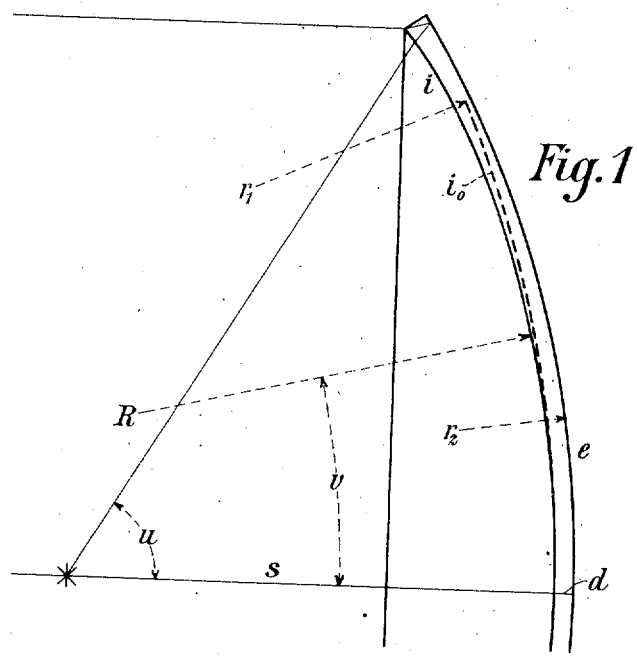

M. VON ROHR.
SEARCH LIGHT REFLECTOR.
APPLICATION FILED MAY 8, 1906.

903,321.

Patented Nov. 10, 1908.

Witnesses:
Paul Krüger
Fritz Sander

Inventor:
Moritz von Rohr

UNITED STATES PATENT OFFICE.

MORITZ VON ROHR, OF JENA, GERMANY, ASSIGNOR TO THE FIRM OF CARL ZEISS, OF JENA, GERMANY.

SEARCH-LIGHT REFLECTOR.

No. 903,321.

Specification of Letters Patent.

Patented Nov. 10, 1908.

Application filed May 8, 1906. Serial No. 315,753.

*To all whom it may concern:*

Be it known that I, MORITZ VON ROHR, doctor of philosophy, a citizen of the German Empire, and residing at Carl-Zeiss strasse, Jena, in the Grand Duchy of Saxe-Weimar, Germany, have invented a new and useful Search-Light Reflector, of which the following is a specification.

Hollow reflectors for search lights are now almost exclusively manufactured as glass bodies, which are of lens configuration, their limiting, optically operative, surfaces being coaxial surfaces of revolution and the outer (convex) lens surface silvered. Two kinds of such reflectors are known. In one, hereafter called the spherical one, both surfaces of revolution are spherical and designed so that the lens takes the form of a negative meniscus. These reflectors possess, as is known, the great merit, that their surfaces, being spherical, are easily produced. The design also allows these two surfaces to be determined so that no greater spherical aberration occurs, between any rays entering the lens parallel to the axis, than is admissible for a search light reflector with regard to the minimum diameter of the source of light. A sensible disadvantage of the spherical reflector consists in the great increase of the thickness from the vertex towards the margin. This reflector frequently suffers from cracks in consequence of unequal heating in the mass by the source of light. The second kind of hollow glass search light reflector displays two parabolic surfaces of revolution. It is fairly free from the defect of unequal thickness, but in comparison to the spherical reflector it has the drawback, that the manufacture of the two operative surfaces presents greater difficulty.

The present invention consists in a third kind of hollow glass reflector for search lights. This new reflector possesses a more even thickness than the spherical one. It permits of the reduction of the spherical aberration even to a still greater degree, or its total elimination. As regards the difficulty of manufacture it occupies a mean position between the double parabolic and the spherical reflectors. In order to realize these conditions let a reflector be supposed, whose initial operative surfaces of revolution are spherical but differing from those of the spherical reflector above referred to in that they are nearly or exactly concentric, and whose thickness consequently displays no great difference, or is even everywhere equal. The gross spherical aberration, the inherent property of such a reflector, is eliminated by suitably deforming the inner or outer spherical surface, so that it gives place to a non-spherical surface of revolution. The meridian curve of a surface deformed to counteract the above mentioned aberration can be ascertained not only by calculation but also empirically by carrying out the deformation on a double spherical initial form zonewise and testing the optical effect zonewise.

The calculation of the deformed surface is preferably begun at the vertex, and in addition to the curvature of the spherical surface, the thickness at the vertex of the reflector together with the curvature of the vertex of the deformed surface chosen; the focal length of the reflector being thereby determined.

By the vertex value of curvature of the meridian curve of the non-spherical surface, hereafter called the curvature of the vertex, an ideal spherical surface with the same vertex is determined, from which the non-spherical surface must deviate—in order to counteract the spherical aberration of the reflector—in the direction away from the real spherical surface. If a good spherical correction up to the margin of the reflector would be attained, the curvature of the meridian curve of the non-spherical surface should decrease or increase constantly from the vertex to the margin, according as the outer (reflecting) or the inner (refracting) surface is being deformed. From this it follows that the thickness of the reflector steadily increases up to the margin—though in much lesser degree than in the spherical reflector—if the curvature of the vertex be chosen so as to make the ideal spherical surface concentric to the real spherical surface. In order to obtain a still more uniform thickness of the reflector, with good spherical correction throughout, the rule must be observed that the curvature of the vertex (of the ideal spherical surface) should be smaller, in deformation of the inner surface, and larger, in deformation of the outer, than the curvature of another ideal spherical surface with the same vertex and concentric to the outer or inner real spherical surface respectively.

Figure 2:
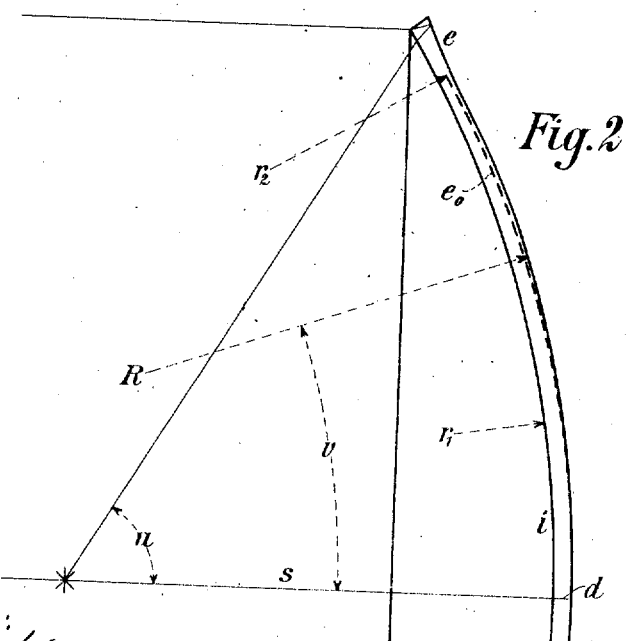

In the accompanying drawing: Figure 1 is an axial section through a reflector spherically corrected according to the invention. Fig. 2 is a similar section through another reflector spherically corrected according to the invention.

The reflector shown in Fig. 1 has the inner surface $i$ deformed. The vertex radius $r_1$ of this non-spherical surface—being at the same time the radius of the ideal spherical surface $i_0$—is greater than the radius $r_2$ of the real spherical surface $e$, so that the surface $i_0$ deviates from another ideal spherical surface (which could not be represented in the drawing) having the same vertex and a radius $r_2 - d$, towards the surface $e$. The radius vector R drawn from that point of the axis $s$, which is the terminal point of the vertex radius $r_1$, to the non-spherical surface $i$ decreases continuously with increasing vectorial angle $v$, the surface $i$ deviating from the surface $i_0$ in the direction away from the surface $e$. The thickness of the reflector decreases slowly from the vertex value $d$ outwards, until it reaches a minimum near the margin, whereafter it increases more rapidly up to the margin. The half angle of aperture $u$ is 59° 30′.

The reflector shown in Fig. 2 has the outer surface $e$ deformed. The vertex radius $r_2$ of this non-spherical surface (the radius of the ideal spherical surface $e_0$) is smaller than the radius $r_1$ of the real spherical surface $i$. Hence the surface $e_0$ deviates towards the surface $i$ from an ideal spherical surface passing through the vertex of $e$ and $e_0$ and having a radius $r_1 + d$. The radius vector R drawn from the terminal point of the vertex radius $r_2$ to the non-spherical surface increases continuously with the vectorial angle $v$, the surface $e$ deviating from the surface $e_0$ in the direction away from the surface $i$. The thickness of the reflector, as in the example shown in Fig. 1, decreases slowly from the value $d$ at the vertex outwards, reaches a minimum near the margin and then increases more rapidly up to the margin. The half angle of aperture $u$ is 59°.

What I claim as my invention, and desire to secure by Letters Patent, is—

1. A hollow glass reflector for search lights and the like, limited by two coaxial surfaces of revolution, an exterior reflecting surface and an interior refracting surface, one of these surfaces being spherical and the other non-spherical, the latter deviating—for the purpose of counteracting the spherical aberration of the reflector—from a coaxial spherical ideal surface, passing through, and having the curvature of, the vertex of the non-spherical surface, in the direction away from the real spherical surface.

2. A spherically corrected hollow glass reflector for search lights and the like, limited by an exterior reflecting surface of revolution and an interior refracting surface of revolution, these surfaces being coaxial to each other, one of them being spherical and the other non-spherical, the non-spherical surface deviating from a coaxial spherical ideal surface, which passes through, and has the curvature of, the vertex of the non-spherical surface, in the direction away from the real spherical surface, and the said ideal surface deviating from another coaxial spherical ideal surface, passing through the same vertex, but concentric to the real spherical surface, in the direction towards this real surface.

In testimony whereof I have signed my name to this specification in the presence of two subscribing witnesses.

MORITZ VON ROHR.

Witnesses:
 PAUL KRÜGER,
 FRITZ SANDER.